(12) United States Patent
Isohata

(10) Patent No.: US 6,327,012 B1
(45) Date of Patent: Dec. 4, 2001

(54) METHOD FOR MANUFACTURING LIQUID CRYSTAL DISPLAY

(75) Inventor: Kyouhei Isohata, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/215,731

(22) Filed: Dec. 18, 1998

(30) Foreign Application Priority Data

Dec. 22, 1997 (JP) .................................................. 9-352714

(51) Int. Cl.⁷ .................................................. G06F 1/1337
(52) U.S. Cl. ............................................. 349/123; 349/124
(58) Field of Search .................................. 349/123, 124, 349/125, 126

(56) References Cited

U.S. PATENT DOCUMENTS

| | | | | |
|---|---|---|---|---|
| 5,691,792 | * | 11/1997 | Mizushima et al. ................. | 349/124 |
| 5,705,096 | * | 1/1998 | Kano et al. ........................... | 349/123 |
| 5,770,826 | * | 6/1998 | Chaudhari et al. .................. | 349/124 |
| 5,817,743 | * | 10/1998 | Gibbons et al. ...................... | 528/353 |
| 5,854,803 | * | 12/1998 | Yamazaki et al. .................... | 372/31 |
| 5,855,968 | * | 1/1999 | Hirata et al. .......................... | 427/533 |
| 5,965,691 | * | 10/1999 | Gibbons et al. ...................... | 528/353 |
| 6,099,786 | * | 8/2000 | Hu et al. ............................... | 264/400 |

FOREIGN PATENT DOCUMENTS

| | | |
|---|---|---|
| 05011250A | 1/1993 | (JP) . |
| 07301776A | 11/1995 | (JP) . |
| 10104625A | 4/1998 | (JP) . |

\* cited by examiner

*Primary Examiner*—William L. Sikes
*Assistant Examiner*—Dung Nguyen
(74) *Attorney, Agent, or Firm*—David G. Conlin; William J. Daley, Jr.; Dike, Bronstein, Roberts & Cushman

(57) ABSTRACT

An orientation film is formed over an electrode substrate via external connection terminals and a surface of the orientation film is processed by the rubbing method. The orientation film on the external connection terminals is irradiated with an ultraviolet laser beam so that the orientation film is removed from the external connection terminals for electrically connecting to terminals of peripheral circuits. Energy density of the ultraviolet laser beam is adjusted to a range of 110 to 210 mJ/cm² with an attenuator.

6 Claims, 3 Drawing Sheets

METHOD FOR MANUFACTURING LIQUID CRYSTAL DISPLAY

BACKGROUND OF THE INVENTION

The present invention relates to a method for manufacturing a liquid crystal display (referred to as LCD hereinafter), and more particularly to an LCD manufacturing method capable of obtaining an LCD having high display grade and high reliability.

An orientation film for performing alignment control of liquid crystal material in the LCD is formed so as to cover not only a display area on an electrode substrate but also a seal-forming area outside the display area. However, the orientation film is not formed on external connection terminals in order to connect with connecting terminals of peripheral parts which constitutes part of the LCD.

When a surface of the orientation film on the electrode substrate is processed by a rubbing method, the external connection terminals are directly subject to friction by a rubbing cloth. This leads to a problem that the external connection terminals are prone to becoming damaged and dirtied by foreign matters and thereby conduction failures might occur when electrically connected to the connecting terminals of the peripheral parts. Further, there is a difference in level between one region where the orientation film is formed and the other region where the orientation film is not formed. Therefore, the difference in level allows pile (fine threads) of the rubbing cloth to be disordered at the time of rubbing. This leads to another problem, non-uniformity on the orientation film that appears in the display area and deteriorates the display grade when the disorder of the pile is transferred to the orientation film.

As measures for solving these problems, there has been proposed a method, as disclosed in Japanese Patent Laid-open Publication Nos. HEI 5-11250 and HEI 7-301776, in which after forming an orientation film as a protective film on the external connection terminals and then performing the orientation process to the surface of the orientation film by the rubbing method, the orientation film is removed by plasma etching so that the external connection terminals are electrically connected to terminals of peripheral parts.

However, since the orientation film is removed by plasma etching, the equipment for plasma etching is large in scale. Also disadvantages in processing capacity and equipment investment are incurred and a problem of high cost arises.

Meanwhile, there has recently been proposed a method for removing the orientation film in which molecular bonds of the orientation film are decomposed and sublimated by using a mercury ultraviolet lamp. With reference to FIG. 3, numeral 20 denotes an ultraviolet beam 20 from a mercury ultraviolet lamp and numeral 21 denotes an electrode substrate. Numerals 22a and 22b denote a display electrode and external connection terminals continuous from the display electrode, respectively. The display electrode 22a and the external connection terminals 22b are formed from a transparent electrically conducting film. Numerals 23 and 24 denote a transparent insulating film and an orientation film, respectively. Also, numeral 25 denotes a mask which has openings so as to be open above regions of the orientation film 24 overlying the external connection terminals 22b. After the mask 25 is placed above the electrode substrate 21, the orientation film 24 on the external connection terminals 22b is irradiated via the mask 25 with the ultraviolet beam 20 from the mercury ultraviolet lamp. Thereby the orientation film 24 on the external connection terminals 22b is removed.

However, in the above method for removing the orientation film 24, it is impossible to accurately control the irradiation range of the ultraviolet beam 20 from the mercury ultraviolet lamp. This is because the ultraviolet beam 20 does not have sufficient directivity. Accordingly, the mask 25 should be used and there arises a problem that production efficiency of the LCD is lowered since it is necessary to add a process of placing the mask 25.

Also, it is difficult to concentrate light intensities of the mercury ultraviolet lamp to the wavelength range in which molecular bonds of the orientation film 24 are decomposed and sublimated. As a result, the electrodes 22a of the transparent conducting film, the insulating film 23, a color filter and other members located near the orientation film 24 that is to be removed are adversely affected, involving faulty phenomena such as deformation due to temperature increases, deterioration of strength, deterioration of coloring and transparency caused by photochemical changes.

SUMMARY OF THE INVENTION

The object of the present invention is to provide a method for manufacturing an LCD in which an LCD that is superior in display grade and higher, in reliability is obtained without the above problems of the prior art.

In order to achieve the above-mentioned object, the present invention provides a method for manufacturing a liquid crystal display, comprising the steps of:

forming an orientation film over an entire electrode substrate, said electrode substrate having external connection terminals at a peripheral portion thereof;

processing a surface of the orientation film by a rubbing method; and irradiating the orientation film on the external connection terminals with an ultraviolet laser beam so as to remove the orientation film from the external connection terminals.

In an embodiment of the invention, energy density of the ultraviolet laser beam is adjusted with an attenuator.

In an embodiment of the invention, energy density of the ultraviolet laser beam is within a range of 110 to 210 mJ/cm$^2$.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is described below with reference to FIGS. 1A, 1B, 1C, 1D, 1E and 2.

FIGS. 1A, 1B, 1C, 1D and 1E are cross-sectional views showing LCD manufacturing processes according to the present invention.

Figure 1A:
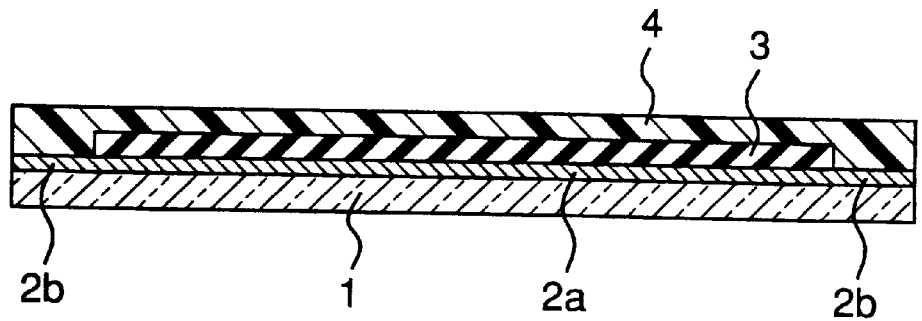
FIGS. 1A, 1B, 1C, 1D and 1E are cross-sectional views showing LCD manufacturing processes according to the present invention.

A transparent, electrically conducting film made of ITO (Indium Tin Oxide) is formed on an electric substrate 1 made of glass, and then is processed by photolithography to form a display electrode 2a and external connection terminals 2b continuous from the display electrode 2a, as shown in FIG. 1A.

Further, a transparent insulating film 3 is formed in a display area, and an orientation film 4 made of polyimide is formed over the entire electrode substrate 1 to a thickness of 50–800 nm by the offset printing method and then a surface of the orientation film 4 is processed by the rubbing method.

When the orientation process by the rubbing method is carried out, the surface of the orientation film 4 has been made to be flat or no difference in level. Therefore, the rubbing process can be carried out with uniform frictional stress. Thereby, disarray of the pile of the rubbing cloth is eliminated and the external connection terminals 2b are prevented from damage.

Figure 1B:
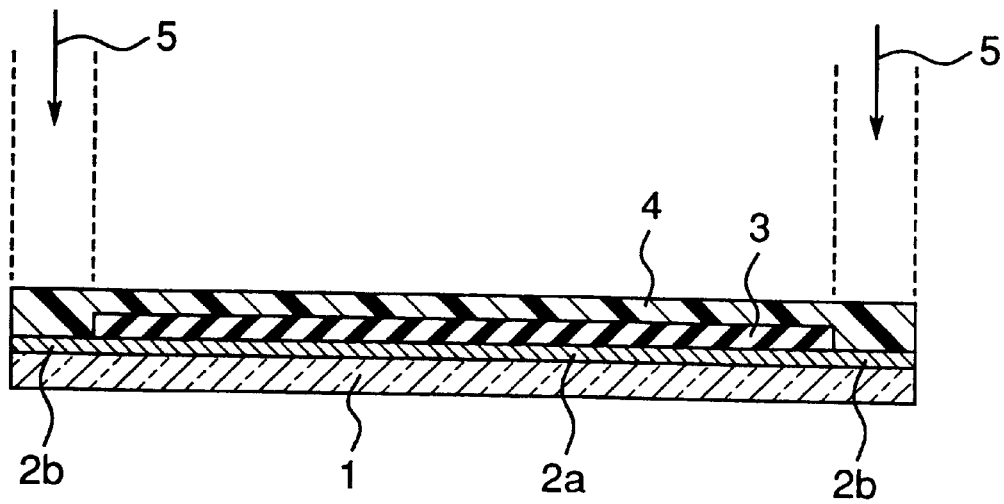
Figure 1C:
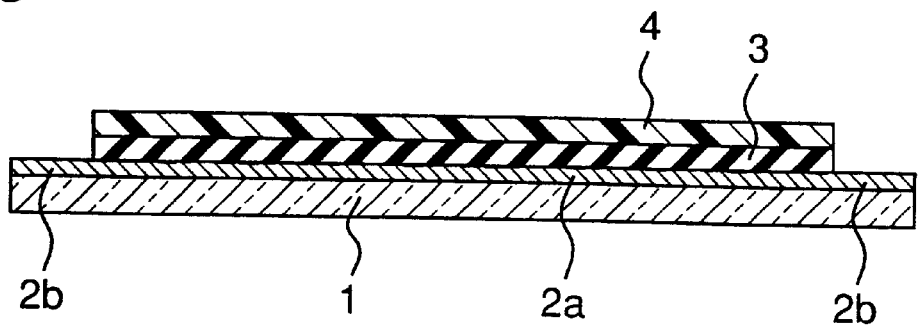

Next, the orientation film 4 on the external connection terminals 2b is irradiated with an ultraviolet laser beam 5 as shown in FIG. 1B so that regions of the orientation film 4 overlying the external connection terminals 2b are removed as shown in FIG. 1C. In this process, because the ultraviolet laser beam 5 has directivity, it is possible to accurately control the irradiation range of the ultraviolet laser beam 5. Therefore, it is unnecessary to cover the orientation film 4 on the display electrodes 2a with a mask, and thus the production efficiency is increased.

Figure 1D:
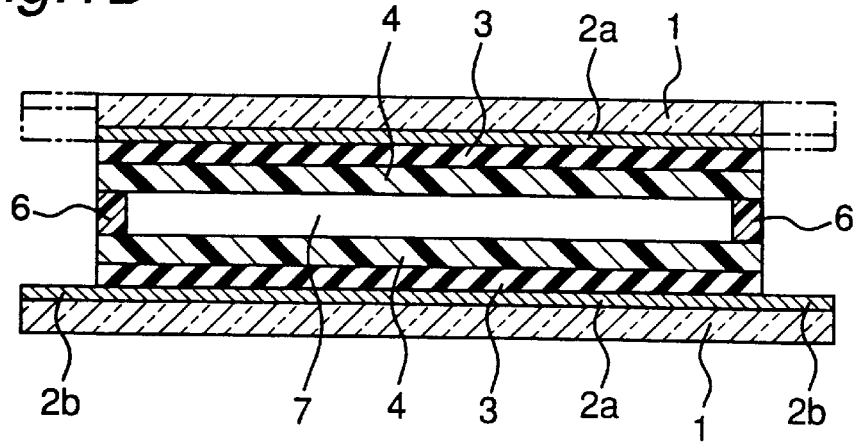
Figure 1E:
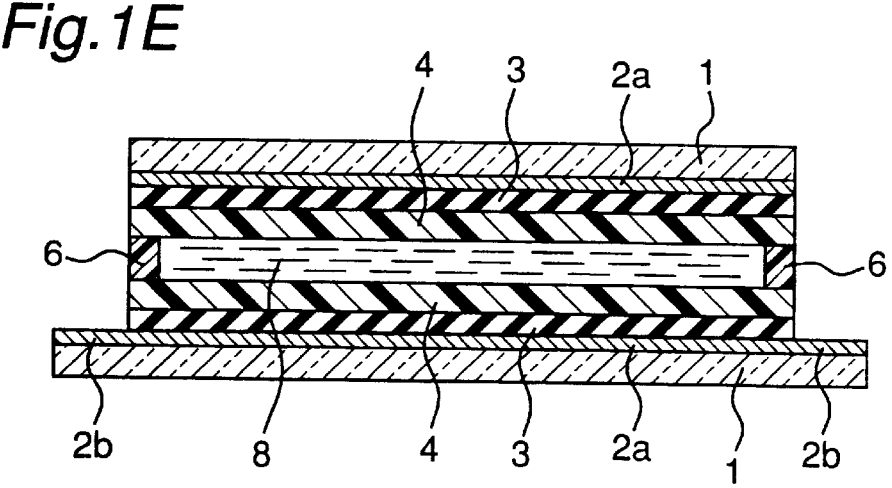

Further, as shown in FIG. 1D, a pair of electrode substrates 1 are bonded together by seal 6 in such a manner that an airspace 7 is formed between the pair of electrode substrates 1. Then, a peripheral portion including the external connection terminals 2b of one of the electrode substrates 1 is cut out. Liquid crystal material 8 is injected into the airspace 7 to form a liquid crystal panel as shown in FIG. 1E.

Further, an anisotropic electrically conductive material, which has been made by dispersing electrically conductive particles of nickel into an adhesive of phenol resin, is applied to the external connection terminals 2b. Connecting terminals of peripheral parts which are not shown are placed on the anisotropic electrically conductive material in order to electrically connect the external connection terminals 2b to the connecting terminals of the peripheral parts by thermal crimp, and thereby an LCD is formed.

As shown above, since the ultraviolet laser beam 5 is used to remove the orientation film 4, the beam intensity can be concentrated to the wavelength range in which molecular bonds of the orientation film 4 are decomposed and sublimated. Thus, use of the ultraviolet laser beam 5 suppresses adverse effects caused by photochemical changes in the display electrodes 2a, the transparent insulating film 3, unshown color filter and other members which are located near the orientation film 4 to be removed.

Figure 2:
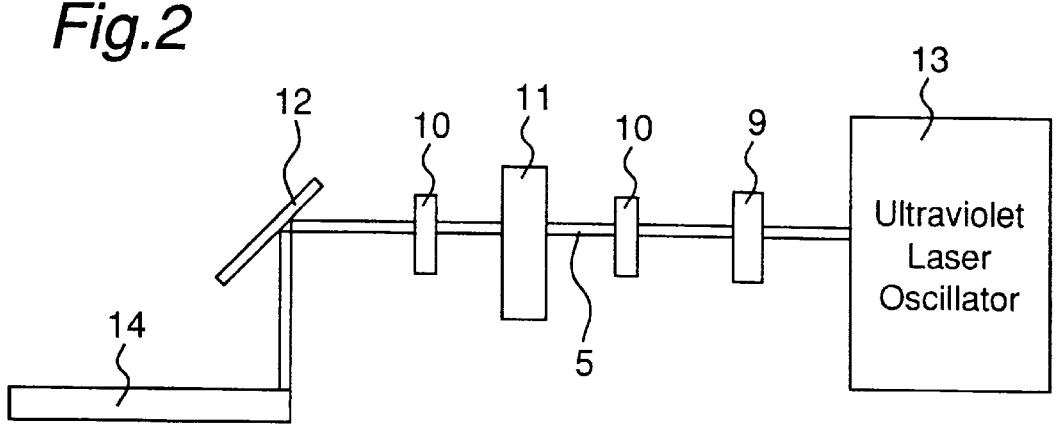
FIG. 2 is a schematic view of equipment for irradiation of an ultraviolet laser beam.
Figure 3:
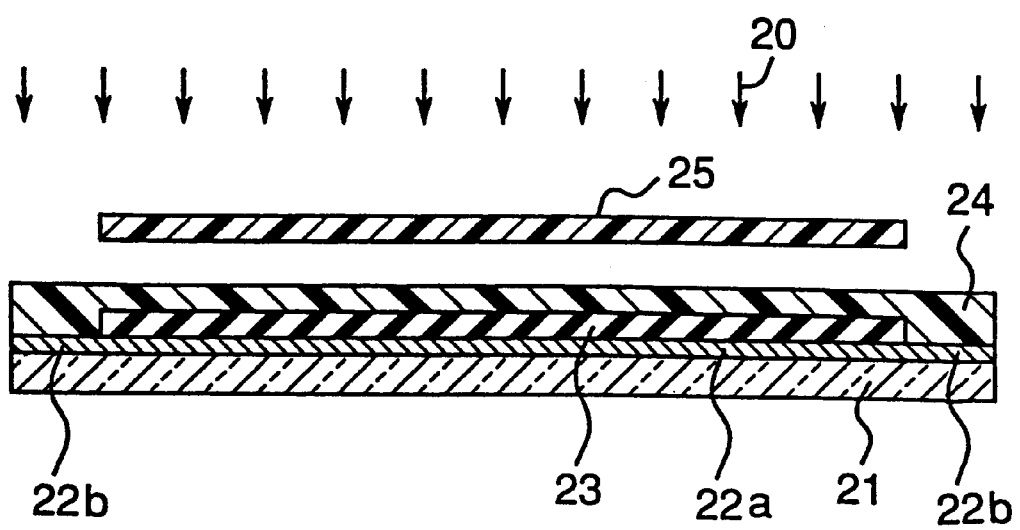
FIG. 3 s a view for explaining a process for removing an orientation film according to the prior art.

FIG. 2 shows a schematic view of equipment for irradiation of the ultraviolet laser beam 5. In this embodiment, a beam of excimer laser which is used as the ultraviolet laser beam 5 is produced from an ultraviolet laser oscillator 13 and has a wavelength of 248 nm, output of 600 mJ, a trapezoidal energy profile and a beam size of 24×10 mm with krypton fluoride purge excitation.

For controlling the energy irradiation amount of the ultraviolet laser beam 5, the ultraviolet laser beam 5 is applied a plurality of times for 1/10 second at a time, and the laser emission time is controlled by the number of times of irradiation.

Furthermore, an attenuator 9 is placed between the ultraviolet laser oscillator 13 and an irradiation target 14 as shown in FIG. 2, and the energy density of the ultraviolet laser beam 5 is controlled by placing an incident angle of the ultraviolet laser beam 5 relative to the attenuator 9. Since the attenuator 9 is able to generally linearly control the energy density of the ultraviolet laser beam 5 by adjusting the incident angle of the ultraviolet laser beam 5, the energy density thereof is easily controlled. Therefore, it is possible to apply the ultraviolet laser beam 5 to the orientation film 4 more accurately at the energy density of irradiation suitable for removal of the orientation film 4.

It is conceivable that the energy density of the ultraviolet laser beam 5 is controlled by using a polarizing filter or a colored filter. However, since the energy density of the ultraviolet laser beam 5 is controlled by absorbing part of the beam and transmitting the rest of the beam with the filter, heat is generated in the filter.

In contrast to this, the attenuator 9 controls the energy density of the ultraviolet laser beam 5 by changing the direction of part of the ultraviolet laser beam 5 and transmitting the rest of the beam 5. Therefore, heat is not generated in the attenuator 9 itself. Thus, the attenuator 9 is capable of withstanding a long term use. Accordingly, the laser irradiation can be implemented without any problems even when laser irradiation needs to be performed over a relatively wide range for a long time, as in the case of laser irradiation to the orientation film 4 on the external connection terminals 2b.

As shown in FIG. 2, an optical system having cylindrical lenses 10, a slit 11 and a mirror 12 is used in order to control an irradiation range of the ultraviolet laser beam 5. The cylindrical lenses 10 converge the ultraviolet laser beam 5, the slit 11 controls the cross-sectional configuration of the ultraviolet laser beam 5, and the mirror 12 controls the direction of the ultraviolet laser beam 5. With these component members, an irradiation range of the ultraviolet laser beam 5 can be controlled in accordance with the position and size of the external connection terminals 2b. When an area of the external connection terminals 2b largely exceeds the irradiation range of the ultraviolet laser beam 5, irradiation of the ultraviolet laser beam 5 may be performed a plurality of times while moving an irradiation target 14.

TABLE 1 shows data on degree of damage to the transparent electrode (ITO: Indium Tin Oxide) and the orientation film (PI: Polyimide) under various conditions of irradiation energy where emission periods and energy density of the ultraviolet laser beam 5 are controlled according to the above method.

TABLE 1

| Number of Irradiation | Energy Density (mJ/cm²) | | | | | | |
|---|---|---|---|---|---|---|---|
| Times | 230 | 210 | 200 | 160 | 140 | 110 | 70 |
| 1 | ITOΔ | O | O | O | O | PIΔ | PIx |
| 2 | ITOΔ | O | O | O | O | PIΔ | PIx |
| 3 | ITOx | O | O | O | O | O | PIx |
| 5 | ITOx | O | O | O | O | O | PIx |
| 10 | ITOx | ITOΔ | O | O | O | O | PIx |
| 20 | ITOx | ITOΔ | ITOΔ | O | O | O | PIx |
| 30 | ITOx | ITOx | ITOΔ | O | O | O | PIx |

ITOΔ: ITO is damaged (ITO film surface is roughened like satin in central portion of the beam where energy density is high);
ITOx: ITO is damaged (ITO film is cracked in central portion of the beam where energy density is high);
PIΔ: PI remains (PI film remains thinly in periphery of central portion of the beam where energy density is low);
PIx: PI remains (PI is not removed uniformly; PI film is removed only in central portion of the beam); and
O: PI is removed successfully and ITO is free from damage.

ITOΔ: ITO is damaged (ITO film surface is roughened like satin in central portion of the beam where energy density is high);

ITOx: ITO is damaged (ITO film is cracked in central portion of the beam where energy density is high);

PIΔ: PI remains (PI film remains thinly in periphery of central portion of the beam where energy density is low);

PIx: PI remains (PI is not removed uniformly; PI film is removed only in central portion of the beam); and O: PI is removed successfully and ITO is free from damage.

According to this data, if the energy density of the ultraviolet laser beam 5 is within a range of 110–210 mJ/cm$^2$, the orientation film is removed successfully (marked with "O" in TABLE 1) by properly controlling the number of times of irradiation. The energy density of 110–210 mJ/cm$^2$ suppresses adverse effects in terms of photochemical changes on the display electrodes 2a, the transparent insulating film 3, unshown color filter and other members located near the orientation film 4 while the orientation film 4 is removed by making the molecular bonds of the orientation film efficiently decomposed and sublimated.

It is to be noted that materials which are used for the electrode substrate, the orientation film or the like in the above embodiment are not limitative and different materials which have same properties as those may be used.

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A method for manufacturing a liquid crystal display, comprising the steps of:

forming an orientation film over an entire electrode substrate, said electrode substrate having external connection terminals at a peripheral portion thereof;

processing a surface of the orientation film by a rubbing method;

irradiating the orientation film on the external connection terminals, with an ultraviolet laser beam so as to remove the orientation film from the external connection terminals; and wherein said step of irradiating includes adjusting an energy density of the ultraviolet laser beam so as to be within a range of 110 to 210 mJ/cm$^2$; and wherein said adjusting a beam intensity includes adjusting the beam intensity so as to be concentrated in the wavelength range in which molecular bonds of the orientation film are decomposed and sublimated.

2. The method for manufacturing a liquid crystal display as claimed in claim 1, wherein said step of irradiating includes adjusting an energy density of the ultraviolet laser beam with an attenuator.

3. The method for manufacturing a liquid crystal display as claimed in claim 1, wherein said step of irradiating includes adjusting a wavelength of the untraviolet laser beam so as to be 248 nm.

4. The method for manufacturing a liquid crystal display, comprising the steps of:

forming an orientation film over an entire electrode substrate, said electrode substrate having external connection terminals at a peripheral portion thereof;

processing a surface of the orientation film by a rubbing method;

irradiating the orientation film, formed over the external connection terminals, with an ultraviolet laser beam so as to remove the orientation film from the external connection terminals; and wherein said irradiating includes adjusting an energy density of the ultraviolet laser beam so as to be within a range of 110 to 210 mJ/cm$^2$ with an attenuator; and wherein said adjusting includes adjusting a beam intensity so as to be concentrated in the wavelength range in which molecular bonds of the orientation film are decomposed and sublimated.

5. The method for manufacturing a liquid crystal display as claimed in claim 4, wherein said step of irradiating includes adjusting a wavelength of the ultraviolet laser beam so as to be 248 nm.

6. A method for manufacturing a liquid crystal display, comprising the steps of:

forming an orientation film over an entire electrode substrate, the electrode substrate having external connection terminals at a peripheral portion thereof;

processing a surface of the orientation film by a rubbing method;

irradiating the orientation film, formed over the external connection terminals, with an ultraviolet laser beam so as to remove the orientation film from eternal connection terminals; and wherein said irradiating includes adjusting a wavelength of the ultraviolet laser beam so as to be 248 nm and an energy density of the ultraviolet laser beam so as to be within a range of 110 to 210 mJ/cm$^2$ with an attenuator.

* * * * *